(12) United States Patent
Fukunaka et al.

(10) Patent No.: US 7,718,922 B2
(45) Date of Patent: May 18, 2010

(54) OPTICAL PROCESSING APPARATUS

(75) Inventors: Tomoko Fukunaka, Shiga (JP);
Masashi Ishiguro, Hyogo (JP);
Mamoru Watanabe, Hyogo (JP);
Kazuhiko Yamashita, Hyogo (JP);
Masahiro Sato, Hyogo (JP); Ryoji Inutsuka, Osaka (JP); Kenji Takahashi, Osaka (JP); Toshikazu Yoneda, Osaka (JP)

(73) Assignee: Panasonic Corporation, Osaka (JP)

( * ) Notice: Subject to any disclaimer, the term of this patent is extended or adjusted under 35 U.S.C. 154(b) by 157 days.

(21) Appl. No.: 11/492,824

(22) Filed: Jul. 26, 2006

(65) Prior Publication Data

US 2006/0261047 A1 Nov. 23, 2006

Related U.S. Application Data

(62) Division of application No. 10/842,418, filed on May 11, 2004, now Pat. No. 7,419,085.

(30) Foreign Application Priority Data

| May 13, 2003 | (JP) | ............................. 2003-134097 |
| May 15, 2003 | (JP) | ............................. 2003-136975 |
| May 15, 2003 | (JP) | ............................. 2003-136976 |

(51) Int. Cl.
*B23K 26/08* (2006.01)
*B23K 31/02* (2006.01)

(52) U.S. Cl. ............................. 219/121.78; 219/121.63; 219/121.73; 228/180.5; 228/104; 228/103; 228/8; 356/402; 356/425

(58) Field of Classification Search ............. 228/180.5, 228/102, 103, 104, 105, 223, 8, 43; 219/121.63, 219/121.61, 121.73, 121.74, 121.75, 616, 219/636, 121.78, 121.82, 121.83, 121.76; 356/402, 425

See application file for complete search history.

(56) References Cited

U.S. PATENT DOCUMENTS 4,671,446 A 6/1987 Sherman ...................... 228/4.5

(Continued)

FOREIGN PATENT DOCUMENTS

JP 06169167 * 6/1994

(Continued)

OTHER PUBLICATIONS

Hayakawa Jun, Method and Device for Laser Beam Soldering, Aug. 2002, JPO and NCIPI, English Translation of JP-2002-001521.

*Primary Examiner*—Roy King
*Assistant Examiner*—Michael Aboagye
(74) *Attorney, Agent, or Firm*—McDermott Will & Emery LLP

(57) ABSTRACT

An optical processing apparatus that is capable of detecting accurately the sticking status of deposits sticking to optical means in a background of same color as deposits, preventing occurrence of defective soldering due to feeding failure of wire solder, and detecting solder failure when the leading end portion of the wire solder does not reach up to the processing area. This optical processing apparatus comprises light energy output means for producing light energy, a first optical path for guiding the light energy into a work, optical means disposed in the first optical path for shaping the light energy, a second optical path sharing part of the first optical path for guiding the light from the work to photo receiving means, and driving means for changing the relative positions of at least the optical means and the work.

7 Claims, 17 Drawing Sheets

U.S. PATENT DOCUMENTS 4,872,052 A * 10/1989 Liudzius et al. ............. 348/126
5,148,375 A * 9/1992 Horikami .................... 382/150
5,524,152 A * 6/1996 Bishop et al. ............... 382/165
6,696,668 B2 * 2/2004 Hayakawa ............. 219/121.85
7,419,085 B2 * 9/2008 Fukunaka et al. ........ 228/180.5
2002/0090014 A1 * 7/2002 Ishimaru ...................... 372/36
2004/0226979 A1 11/2004 Sato et al. .................... 228/41

FOREIGN PATENT DOCUMENTS

JP          P2002-1521 A          1/2002

* cited by examiner

OPTICAL PROCESSING APPARATUS

RELATED APPLICATIONS

This application is a divisional application of Ser. No. 10/842,418, filed May 11, 2004 as U.S. Pat. No. 7,419,085, which claims priority of Japanese Patent application Nos. 2003-134097, filed May 13, 2003; 2003-136975, filed May 15, 2003 and 2003-136976, filed May 15, 2003, the contents of which are herewith incorporated by reference.

FIELD OF THE INVENTION

The present invention relates to a optical processing apparatus for processing by utilizing light energy.

BACKGROUND OF THE INVENTION

Hitherto, a optical processing apparatus comprises light energy output means for producing light energy, a first optical path for guiding the light energy into a work, optical means disposed in the first optical path for shaping the light energy, a second optical path sharing part of the first optical path for guiding the light from the work to photo receiving means, and driving means for changing the relative positions of at least the optical means and work.

Such conventional processing apparatus by light energy is disclosed in Japanese Laid-open Patent No. 2002-1521.

SUMMARY OF THE INVENTION

A optical processing apparatus comprising:
light energy output means for producing light energy;
a first optical path for guiding the light energy into a work;
optical means disposed in the first optical path for shaping the light energy;
a second optical path sharing part of the first optical path for guiding the light from the work to photo receiving means; and
driving means for changing the relative positions of at least the optical means and work,
in which a judging part of a color different from deposits sticking to the optical means is provided, and the optical means is positioned at the judging part, and the photo receiving means detects the sticking status of deposits to the optical means.

A optical processing apparatus comprising:
light energy output means for producing light energy;
a first optical path for guiding the light energy into a work;
optical means disposed in the first optical path for shaping the light energy;
a second optical path sharing part of the first optical path for guiding the light from the work to photo receiving means,
driving means for changing the relative positions of at least the optical means and work;
wire solder feed means for feeding a wire solder closely to a processing position of the work;
leading end shape detecting means for detecting the shape of leading end portion of the wire solder; and
solder fusing part heating means disposed at a position different from the processing position for heating the solder fusing part, in which the driving means moves the leading end of the wire
solder to the solder fusing part when the leading end portion of the wire solder is not needed, and the light energy is emitted to the leading end portion of the wire solder.

A optical processing apparatus comprising:
light energy output means for producing light energy;
a first optical path for guiding the light energy into a work;
optical means disposed in the first optical path for shaping the light energy;
a second optical path sharing part of the first optical path for guiding the light from the work to photo receiving means;
driving means for changing the relative positions of at least the optical means and work;
wire solder feed means for feeding a wire solder closely to a processing position of the work; and
wire solder leading end position detecting means for detecting at least the position of leading end portion of the wire solder, and detecting failure of soldering when the leading end portion of the wire solder is not positioned at the processing position.

DETAILED DESCRIPTION OF THE EXEMPLARY EMBODIMENTS

However, in the detecting method of sticking state of deposits in the conventional optical processing apparatus, if a same color as deposits sticking to the optical means is present in a position of background of the optical means, the sticking status cannot be detected accurately.

The invention is devised to detect the sticking status accurately if a same color as deposits sticking to the optical means is present in a position of background of the optical means. Examples of the invention are described in exemplary embodiments 1 to 7 below.

Exemplary Embodiment 1

Figure 1:
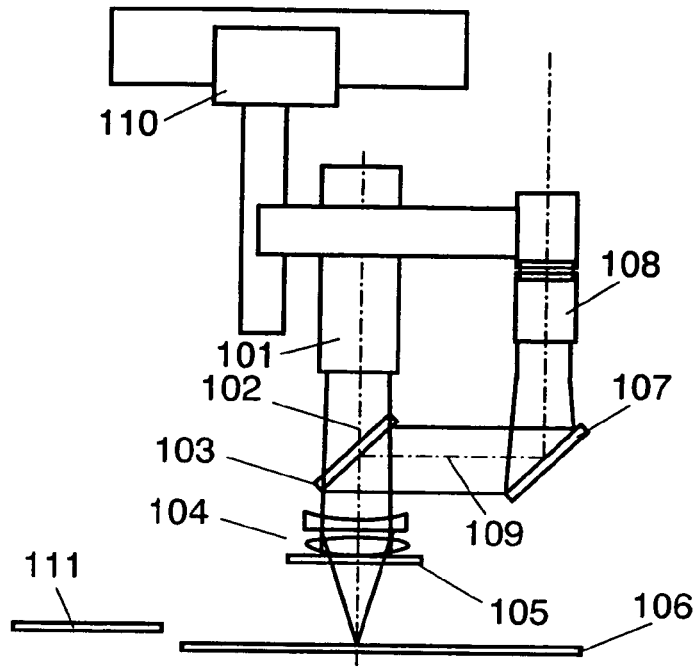
FIG. 1 is a schematic explanatory diagram in exemplary embodiment 1 of the invention.

A first exemplary embodiment of the invention is described below while referring to FIGS. 1, 8, and 9. Light energy output means 101 produces light energy as processing energy source. A first optical path 102 of light energy guides the light energy into a work 106. A half mirror 103 has a characteristic of transmitting wavelength components of light energy and reflecting visible light components. Optical means 104 shapes the light energy, and focuses the light emitted from the light energy output means 101 into a light of required beam diameter. Its focusing characteristic is determined in conformity to the divergent property of light from the light energy output means 101. A detachable protective glass 105 prevents foreign matter of processing from sticking to the optical means 104. By replacing it when the light energy output is lowered due to foreign matter deposits, the optical output is recovered, and the maintenance is facilitated. The work 106 is the object of processing in this apparatus. A mirror 107 guides the light reflected from the work 106 into photo receiving means. Photo receiving means 108 detects the light reflected from the work 106 as an image of the work. An optical path 109 is an optical path of the photo receiving means. The block from the light energy output means 101 to the optical path 109 is called a processing head. Driving means 110 changes relative positions of the work 106 and deposit judging part 111 and processing head. The deposit judging part 111 of plural different colors can judge the deposits.

In the optical processing apparatus having such configuration, the operation is described below.

Light emitted from the light energy output means 101 passes the half mirror 3 by way of the first optical path 102, and enters the optical means 4. This light is focused into a necessary size, and is emitted to the work 106 by way of the protective glass 105, and the work 106 is machined by the focused light.

On the other hand, the light reflected by the work 106 propagates the second optical path 109 by way of the protective glass 105, optical means 104, and half mirror 103. The light is reflected again by the mirror 107, and enters the photo receiving means 108.

The driving means 110 can change the relative positions of the work 106, deposit judging part 111, and processing head. On the basis of the image information of the work 106 obtained from the photo receiving means 108, the processing head is moved to the processing position of the work 106 by the driving means 110, and a light beam is emitted from the processing head and processing is done.

Figure 8:
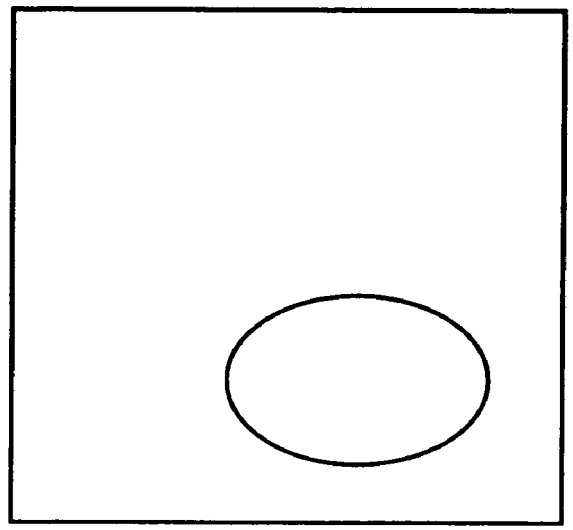
FIG. 8 is an explanatory diagram showing the relation when deposits and background are same in color.
Figure 9:
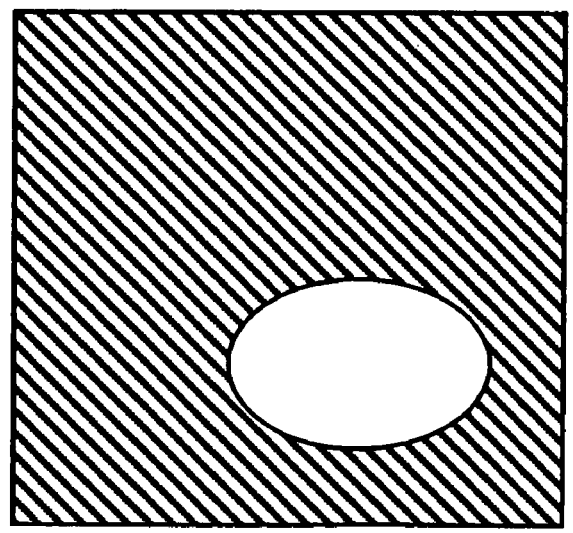
FIG. 9 is an explanatory diagram showing the relation when deposits and background are different in color.

If the work and deposits are of same color, if attempted to detect deposits at the processing position, it is hard to distinguish the deposits as shown in FIG. 8. Therefore, to detect the deposits in the background of a different color from the deposits, in deposits detection operation of the protective glass 105, the color of the work 106 is detected, and the processing head is moved by the driving means 110 to the deposits judging part 111 of a most different color from the deposits sticking to the protective glass 105. Then the photo receiving means 108 detects the sticking status of deposits.

Deposits can be roughly predicted from the work 106 or processing process (soldering, cutting, etc.), and the deposits judging part 111 is determined accordingly. Not limited to a single detection of deposits, by continuing detection by moving sequentially to deposits detecting parts 111 of different colors, deposits of plural colors can be detected effectively.

By this configuration, processing is possible regardless of processing position of the work or the location of the deposits judging part.

Specific examples of light energy include laser and lamp, the photo receiving means is realized by camera, and the image correcting means is a lens.

Thus, in the conventional method of detecting the sticking status of deposits, in the location of same color as the deposits sticking to the optical means, the sticking status cannot be detected accurately. By contrast, in the exemplary embodiment, deposits judging parts 111 of plural different colors are provided, and judging from the color of the work 106, by moving the positions sequentially from the judging part of the most different color from the deposits sticking to the optical means 104, the sticking status of deposits to the optical means 104 can be easily detected by the photo receiving means 108.

Exemplary Embodiment 2

A second exemplary embodiment of the invention is described below while referring to FIG. 2.

Figure 2:
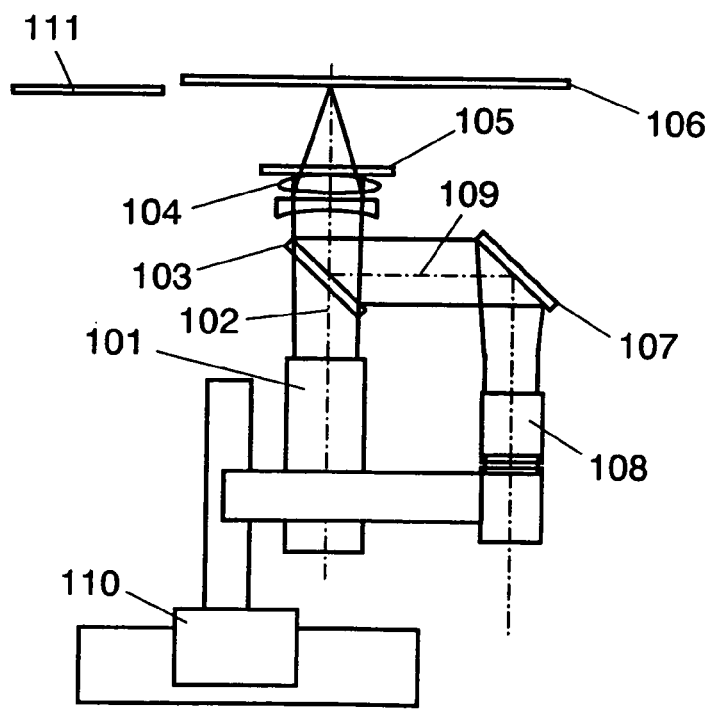
FIG. 2 is a schematic explanatory diagram in exemplary embodiment 2 of the invention.

In FIG. 2, the processing head comprising the light energy output means 101 to optical path 109, the driving means 110, and the deposits judging part 111 are same as in exemplary embodiment 1, and the explanation is omitted.

What is characteristic of this exemplary embodiment is that these members are disposed at the lower side (the direction of gravity) of the work 106.

In the optical processing apparatus thus configured, the operation is explained. Light emitted from the light energy output means 101 passes the half mirror 103 along the first optical path 102, and enters the optical means 104. This light is focused into a necessary size, and is emitted to the work 106 by way of the protective glass 105. The work 106 is machined by this focused light. The light reflected by the work 106 passes through the protective glass 105 and optical means 104, and is reflected by the half mirror 103 to get into the second optical path 109, and is reflected again by the mirror 107, and enters the photo receiving means 108. This area is called the processing head, and is installed at the lower side of the work, and the lower side of the work 106 can be machined.

Therefore, if the processing side of the work 106 is at the lower side, it is not required to invert the work 106, and inverting device is not needed. Hence, it is free from risk of dislocation due to inversion of the work 106 or dropping of the work or parts mounted thereon.

Exemplary Embodiment 3

A third exemplary embodiment of the invention is described below while referring to FIG. 3.

Figure 3:
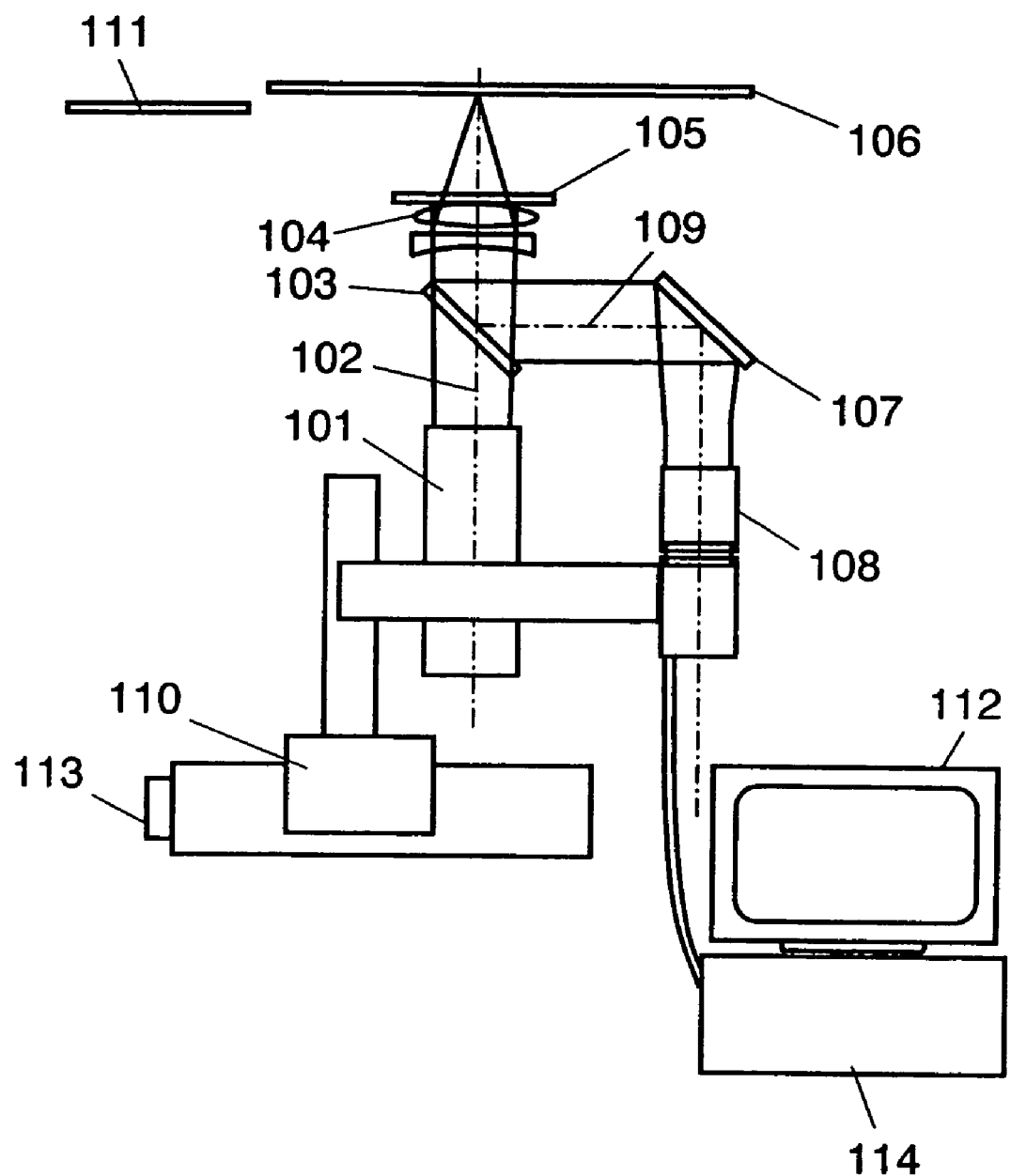
FIG. 3 is a schematic explanatory diagram in exemplary embodiment 3 of the invention.

In FIG. 3, the processing head comprising the light energy output means 101 to optical path 109, the driving means 110, and the deposits judging part 111 are same as in exemplary embodiment 1, and the explanation is omitted.

What is characteristic of this exemplary embodiment is that these members are disposed at the lower side (the direction of gravity) of the work 106, and that it further comprises display means 112 for displaying the image of the work 106 obtained by the photo receiving means 108, recognition means 113 for detecting the position of the processing head for leading out the processing position, and processing position detecting means 114 for leading out the processing position. In this exemplary embodiment, if the processing side of the work 106 is at the lower side, it is not required to invert the work 106, and inverting device is not needed. Hence, it is free from risk of dislocation due to inversion of the work 106 or dropping of the work or parts mounted thereon.

Moreover in this exemplary embodiment, the processing position detecting means 114 detects the position of light beam emitted from the processing head on the basis of the information from the processing head position recognition means 113. This signal is sent to the display means 112, and is displayed as an image. The image of the work 106 is converted into an electric signal by the photo receiving means 108, and is displayed as an image of processing position of the work 106 by the display means 112.

Accordingly, if the processing area is small, or the processing area is at the lower side of the work and is hard to recognize visually, it can be observed easily, or if the position is deviated, it can be easily detected.

The processing position detecting means 114 is, for example, a computer, and the display means 112 is a CRT or LCD display device.

Having such display means 112, if the processing side is at the lower side of the work 106 and is hard to recognize visually, position teaching or correction confirmation may be easily done. Further, by displaying the image of the work 106 and the present light beam position in the display means 112, the location of the present light beam in the work or the processing position can be easily known. Also because of off-line teaching, the position can be taught without stopping the production line.

Exemplary Embodiment 4

A fourth exemplary embodiment of the invention is described below while referring to FIG. 4.

Figure 4:
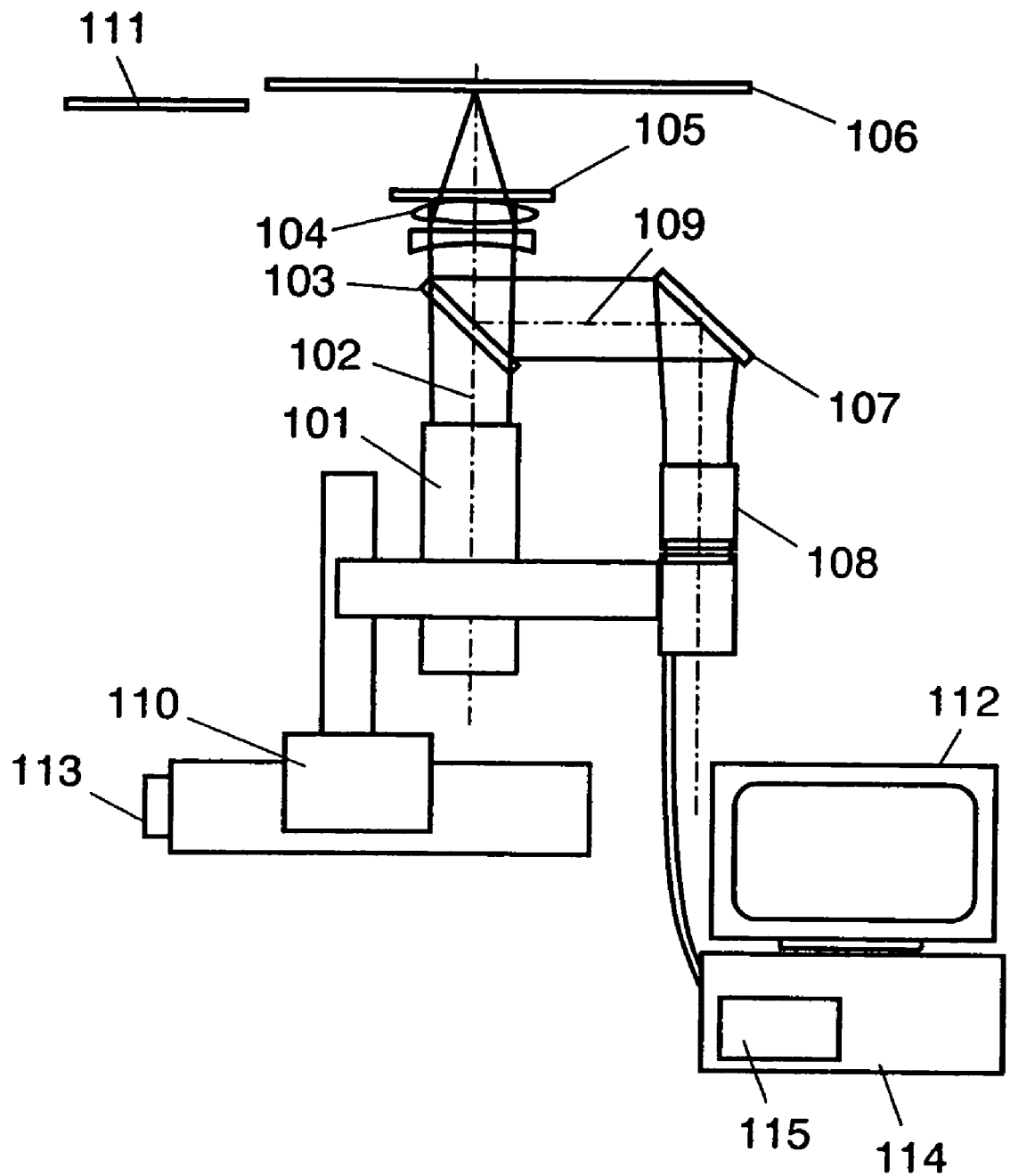
FIG. 4 is a schematic explanatory diagram in exemplary embodiment 4 of the invention.

In FIG. 4, the processing head comprising the light energy output means 101 to optical path 109, the driving means 110, and the deposits judging part 111 are same as in exemplary embodiment 1, and the explanation is omitted.

What is characteristic of this exemplary embodiment is that these members are disposed at the lower side (the direction of gravity) of the work 106, and that it further comprises display means 112 for displaying the image of the work 106 obtained by the photo receiving means 108, recognition means 113 for detecting the position of the processing head for leading out the processing position, processing position detecting means 114 for leading out the processing position, and processing position detection correcting means 115.

In the optical processing apparatus thus configured, the operation is explained below.

In this exemplary embodiment, if the processing side of the work 106 is at the lower side, it is not required to invert the work 106, and inverting device is not needed. Hence, it is free from risk of dislocation due to inversion of the work 106 or dropping of the work or parts mounted thereon.

Moreover in this exemplary embodiment, the processing position detecting means 114 detects the position of light beam emitted from the processing head on the basis of the information from the processing head position recognition means 113. This signal is sent to the display means 112, and is displayed as an image. The image of the work 106 is converted into an electric signal by the photo receiving means 108, and is displayed as an image of processing position of the work 106 by the display means 112. Herein, the processing position detection correcting means 115 detects the difference between the position of processing area of the work 106 by the photo receiving means 108 and the position of light beam emitted from the processing head, and sends the information to the processing position detecting means 114. The processing position detecting means 114 positions the processing head by compensating so as to eliminate the position error by the driving means 110 on the basis of this error position information, and processing is started by manipulating the output means 101 of the processing head.

The processing head position recognizing means is realized, for example, by an encoder of driving means, and the position detection correcting means is an image recognition device.

Thus, by correcting the difference of the emitting position of light beam and processing position of the work 106 by the driving means 110, the processing precision can be enhanced.

Exemplary Embodiment 5

A fifth exemplary embodiment of the invention is described below while referring to FIG. 5.

Figure 5:
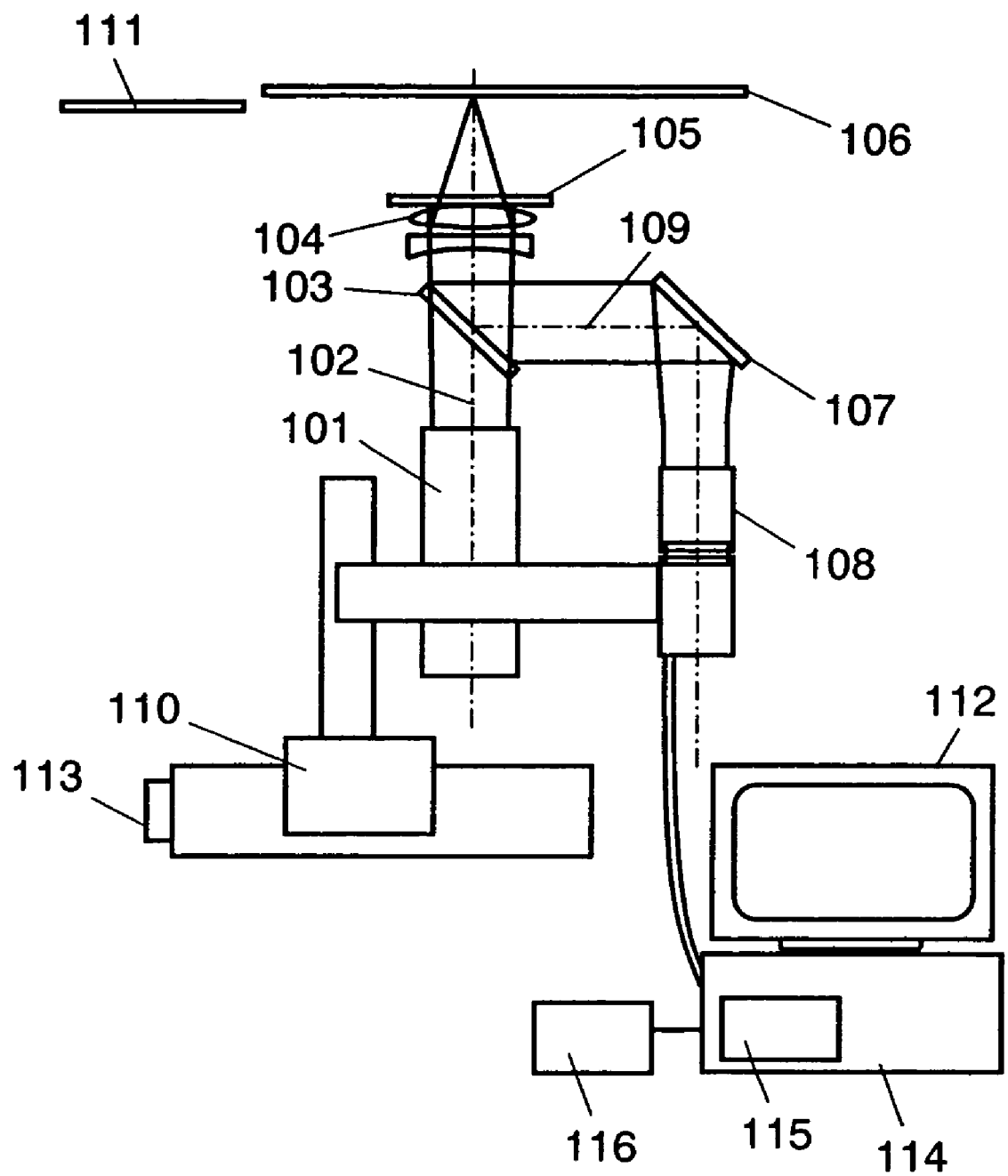
FIG. 5 is a schematic explanatory diagram in exemplary embodiment 5 of the invention.

In FIG. 5, the processing head comprising the light energy output means 101 to optical path 109, the driving means 110, and the deposits judging part 111 are same as in exemplary embodiment 1, and the explanation is omitted. What is characteristic of this exemplary embodiment is that these members are disposed at the lower side (the direction of gravity) of the work 106, and that it further comprises display means 112 for displaying the image of the work 106 obtained by the photo receiving means 108, recognition means 113 for detecting the position of the processing head for leading out the processing position, processing position detecting means 114 for leading out the processing position, processing position detection correcting means 115, and image memory means 116.

In the optical processing apparatus thus configured, the operation is explained below.

In this exemplary embodiment, if the processing side of the work 106 is at the lower side, it is not required to invert the work 106, and inverting device is not needed. Hence, it is free from risk of dislocation due to inversion of the work 106 or dropping of the work or parts mounted thereon.

Moreover in this exemplary embodiment, the processing position detecting means 114 detects the position of light beam emitted from the processing head on the basis of the information from the processing head position recognition means 113. This signal is sent to the display means 112, and is displayed as an image. The image of the work 106 is converted into an electric signal by the photo receiving means 108, and is displayed as an image of processing position of the work 106 by the display means 112. Herein, the processing position detection correcting means 115 detects the difference between the position of processing area of the work 106 by the photo receiving means 108 and the position of light beam emitted from the processing head, and sends the information to the processing position detecting means 114. The processing position detecting means 114 positions the processing head by compensating so as to eliminate the position error by the driving means 110 on the basis of this error position information, and processing is started by manipulating the output means 101 of the processing head.

The image memory means 116 stores image data of the work 106. The image memory means 116 displays its image in the display means 112. The present light beam emitting position is also displayed in the display means 112 by means of the processing position detecting means 114.

Specific examples of image data include CAD data, scanner image, and camera image.

By the image memory means 116 for preliminarily storing the image showing the processing area, it is easy to move to the processing area.

Exemplary Embodiment 6

A sixth exemplary embodiment of the invention is described below while referring to FIG. 6.

Figure 6:
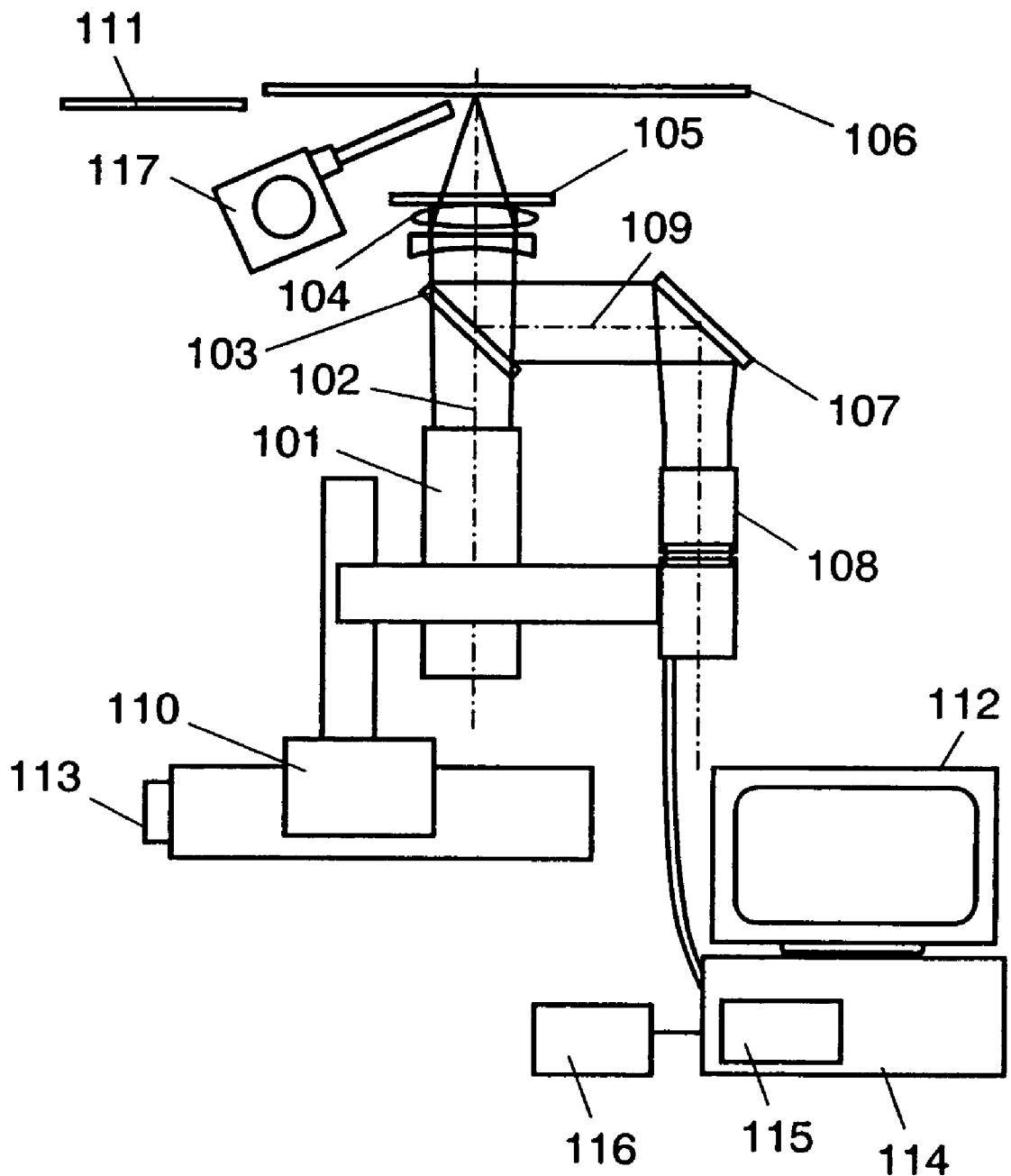
FIG. 6 is a schematic explanatory diagram in exemplary embodiment 6 of the invention.

In FIG. 6, the processing head comprising the light energy output means 101 to optical path 109, the driving means 110, and the deposits judging part 111 are same as in exemplary embodiment 1, and the explanation is omitted.

What is characteristic of this exemplary embodiment is that these members are disposed at the lower side (the direction of gravity) of the work 106, and that it further comprises display means 112 for displaying the image of the work 106 obtained by the photo receiving means 108, recognition means 113 for detecting the position of the processing head for leading out the processing position, processing position detecting means 114 for leading out the processing position, processing position detection correcting means 115, image memory means 116, and a wire solder feed device 117 for feeding a wire solder to the processing area.

In the optical processing apparatus thus configured, the operation is explained below.

In this exemplary embodiment, if the processing side of the work 106 is at the lower side, it is not required to invert the work 106, and inverting device is not needed. Hence, it is free from risk of dislocation due to inversion of the work 106 or dropping of the work or parts mounted thereon.

Moreover, the processing position detecting means 114 detects the position of light beam emitted from the processing head on the basis of the information from the processing head position recognition means 113. This signal is sent to the display means 112, and is displayed as an image. The image of the work 106 is converted into an electric signal by the photo receiving means 108, and is displayed as an image of processing position of the work 106 by the display means 112. Herein, the processing position detection correcting means 115 detects the difference between the position of processing area of the work 106 by the photo receiving means 108 and the position of light beam emitted from the processing head, and sends the information to the processing position detecting means 114. The processing position detecting means 114 positions the processing head by compensating so as to eliminate the position error by the driving means 110 on the basis of this error position information, and processing is started by manipulating the output means 101 of the processing head.

The image memory means 116 stores image data of the work 106. The image memory means 116 displays its image in the display means 112. The present light beam emitting position is also displayed in the display means 112 by means of the processing position detecting means 114.

Specific examples of image data include CAD data, scanner image, and camera image.

Exemplary Embodiment 7

A seventh exemplary embodiment of the invention is described below while referring to FIG. 7.

Figure 7:
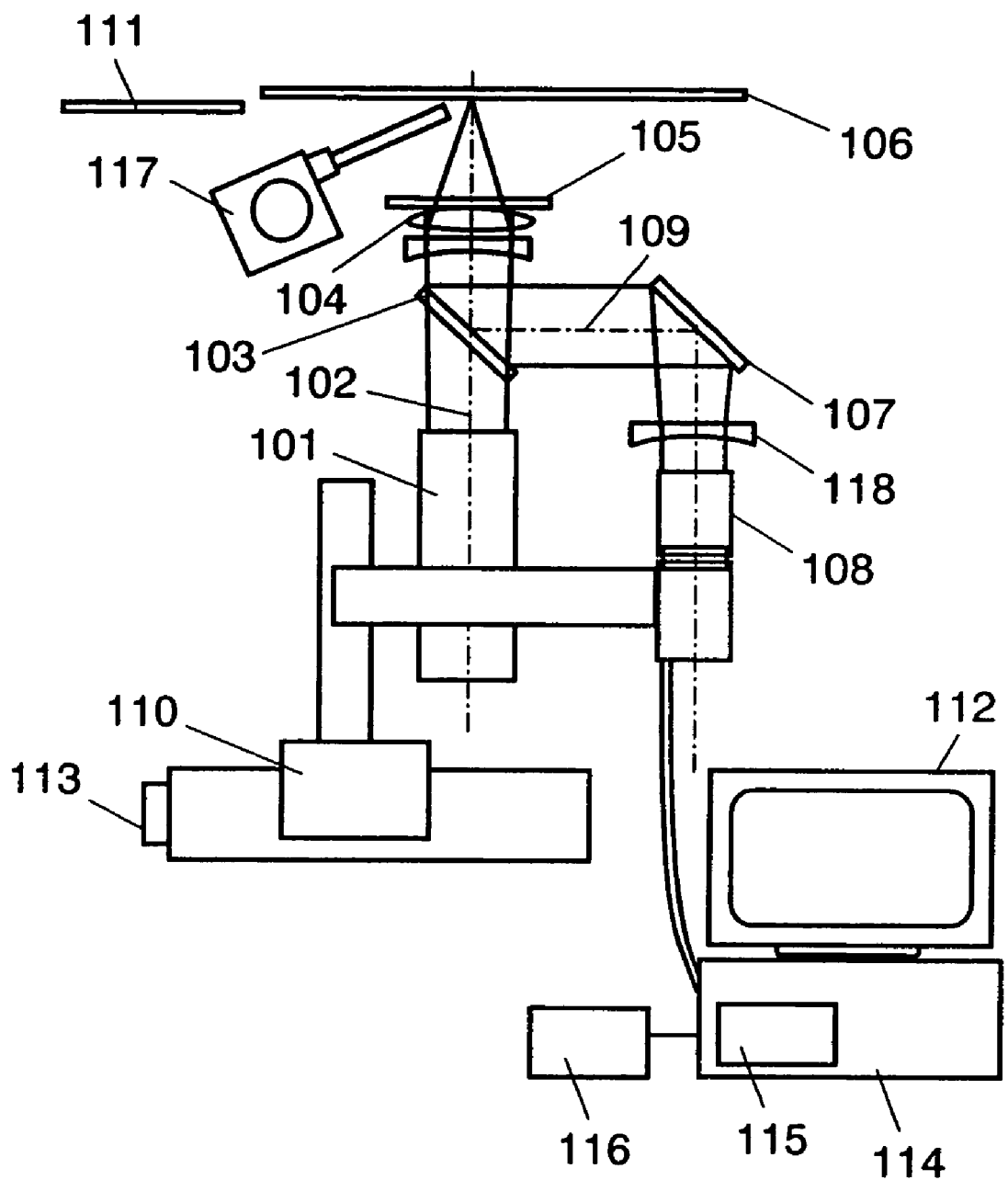
FIG. 7 is a schematic explanatory diagram in exemplary embodiment 7 of the invention.

In FIG. 7, the processing head comprising the light energy output means 101 to optical path 109, the driving means 110, and the deposits judging part 111 are same as in exemplary embodiment 1, and the explanation is omitted.

What is characteristic of this exemplary embodiment is that these members are disposed at the lower side (the direction of gravity) of the work 106, and that it further comprises display means 112 for displaying the image of the work 106 obtained by the photo receiving means 108, recognition means 113 for detecting the position of the processing head for leading out the processing position, processing position detecting means 114 for leading out the processing position, processing position detection correcting means 115, image memory means 116, a wire solder feed device 117 for feeding a wire solder to the processing area, and image distortion compensating means 118 for compensating the image distorted the optical means 104.

In the optical processing apparatus thus configured, the operation is explained below.

In this exemplary embodiment, if the processing side of the work 106 is at the lower side, it is not required to invert the work 106, and inverting device is not needed. Hence, it is free from risk of dislocation due to inversion of the work 106 or dropping of the work or parts mounted thereon.

Moreover, the processing position detecting means 114 detects the position of light beam emitted from the processing head on the basis of the information from the processing head position recognition means 113. This signal is sent to the display means 112, and is displayed as an image. The image of the work 106 is converted into an electric signal by the photo receiving means 108, and is displayed as an image of processing position of the work 106 by the display means 112. Herein, the processing position detection correcting means 115 detects the difference between the position of processing area of the work 106 by the photo receiving means 108 and the position of light beam emitted from the processing head, and sends the information to the processing position detecting means 114. The processing position detecting means 114 positions the processing head by compensating so as to eliminate the position error by the driving means 110 on the basis of this error position information, and processing is started by manipulating the output means 101 of the processing head.

The image memory means 116 stores image data of the work 106. The image memory means 116 displays its image in the display means 112. The present light beam emitting position is also displayed in the display means 112 by means of the processing position detecting means 114.

Specific examples of image data include CAD data, scanner image, and camera image.

Thus, by the image distortion compensating means 118 disposed before the photo receiving means 108, a distortion-free image of the work 106 can be obtained in the photo receiving means 108. As a result, deviation of processing position or size of light focusing diameter can be easily known, and the teaching time is shortened and processing of high precision is realized. As described in the foregoing exemplary embodiments, according to the invention, the sticking status of deposits can be detected more accurately than in the prior art, and the more accurate processing is possible than in the prior art.

Incidentally, in the conventional optical processing apparatus and the production facility using the same, if the wire solder is not supplied normally, the worker visually detects defective soldering after the soldering process, and stops the operation manually. At this time, the worker cuts off the wire solder manually, and restarts the operation manually.

Yet, detection timing of defective feed of wire solder occurs often after occurrence of defective soldering, and the soldering process must be repeated, and an extra step takes place every time.

The invention presents a optical processing apparatus capable of solving such problems in the conventional optical processing apparatus. An example of the invention is explained in exemplary embodiment 8.

The invention prevents defective soldering from occurring. If the processing side is at the lower side of the work, it is not required to invert the work. While holding the wire solder leading end in a normal state and also other positions in normal state, a stable soldering process of high quality can be continued. Further according to the invention, position teaching and correction confirmation can be done easily. If the positioning precision of the work is poor, a high precision of processing position is obtained. Moreover, since the processing area can be taught while observing the image of the work, off-line teaching is possible. The image distortion is small, and the precision is not lowered in the case of teaching, confirming the correction, or recognizing and compensating.

Exemplary Embodiment 8

Figure 10:
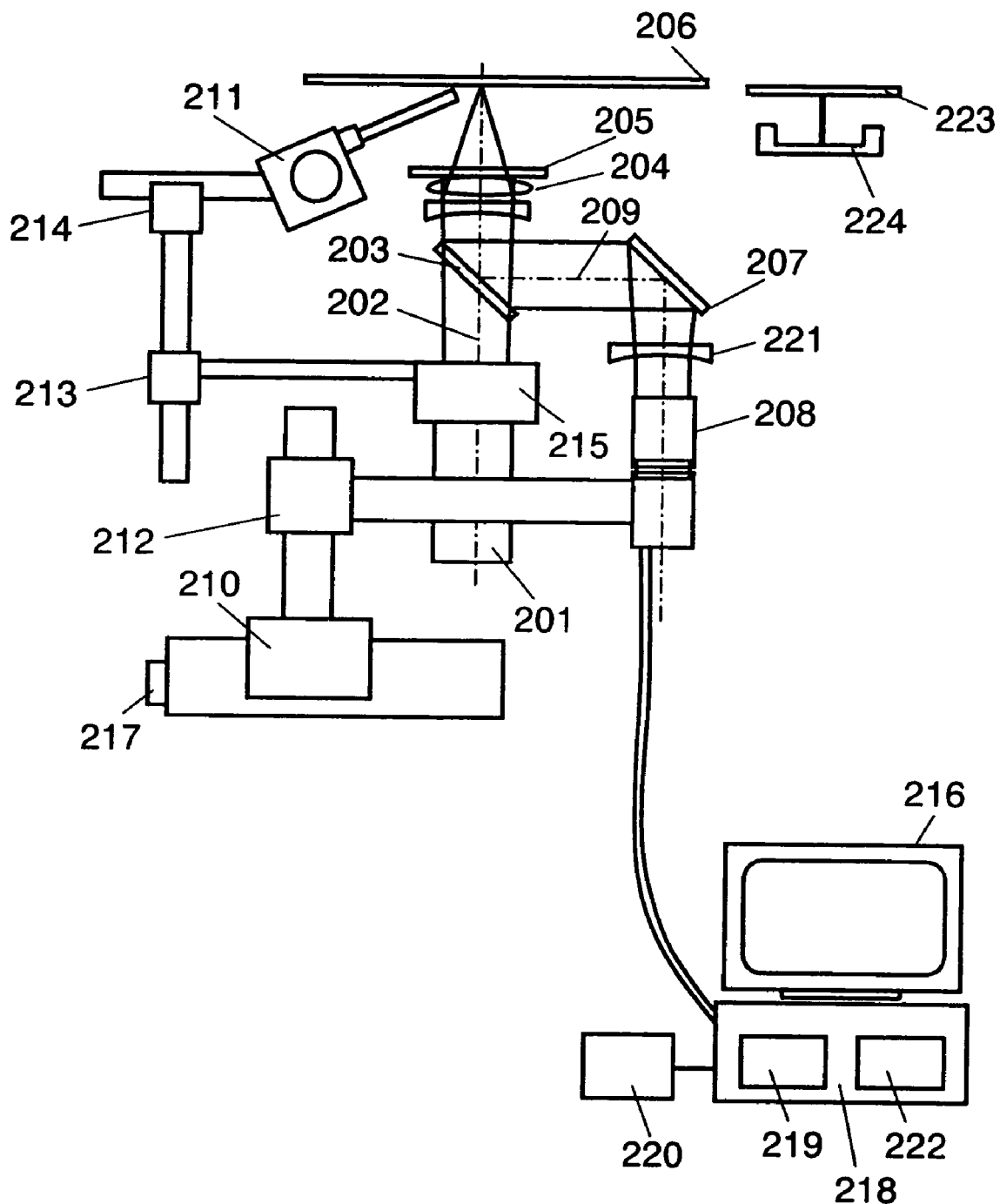
FIG. 10 is an explanatory diagram in exemplary embodiment 8 of the invention.
Figure 11:
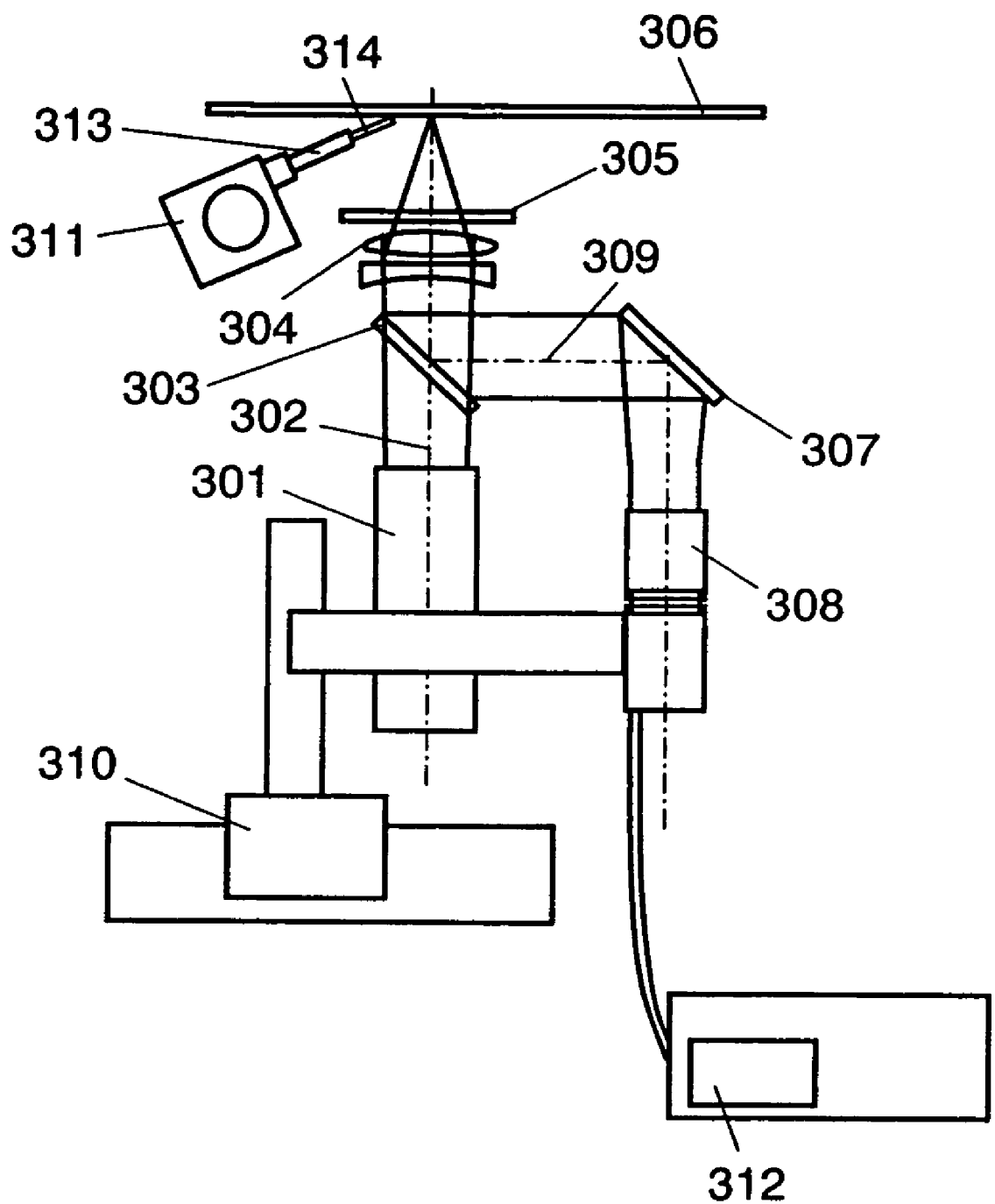
FIG. 11 is an explanatory diagram in exemplary embodiment 9 of the invention.

An eighth exemplary embodiment of the invention is described below while referring to FIG. 10.

Output means 201 produces a light energy. A first optical path 202 shows an optical path of the light energy for guiding the light energy to the work. A half mirror 203 has a function of transmitting wavelength components of light energy, and reflecting visible ray components. Optical means 204 shapes the light energy, and focuses the light emitted from the light energy output means 201 into a necessary beam diameter. Its focusing characteristic is determined depending on the divergent characteristic of the light energy. A protective glass 205 is detachable, and prevents foreign matter generated in processing from sticking to the optical means 204. If the light energy output is lowered due to deposits of foreign matter, it is replaced and the optical output is recovered, and the maintenance is facilitated. A work 206 is the object of processing of this apparatus. A mirror 207 guides the light of the work to photo receiving means 208. The photo receiving means 208 is means for viewing the image of the work. A second optical path 209 shows an optical path of the photo receiving means 208. A processing head is composed of these elements from the light energy output mean 201 to the second optical path 209.

Driving means 210 changes relative positions of the work 206 and optical means 204. First moving means 212 moves the processing head in the vertical direction of the work 206. Second moving means 213 moves a wire solder feed device 211 in the vertical direction of the work 206. Third moving means 214 moves the wire solder feed device 211 in the lateral direction of the work 206. Fourth moving means 215 moves the wire solder feed device 211 in a direction of drawing an arc of the work 206. Display means 216 displays the image of the work 206 obtained from the photo receiving means 208.

Recognition means 217 detects the position of the processing head. Processing position detecting means 218 detects the position of light beam emitted from the processing head on the basis of the information of the processing head position recognition means 217. Processing position detection correcting means 219 detects the difference between the position of processing area of the work 206 by the photo receiving means 208 and the position of light beam emitted from the processing head, and sends the information to the processing position detecting means 218. Image memory means 220 stores image data of the work 206. Image distortion compensating means 221 is disposed between the mirror 207 and photo receiving means 208 in order to compensate the image distorted by the optical means 204.

Leading end shape detecting means 222 detects the leading end shape of wire solder. A solder fusing part 223 is a position for discarding unnecessary portion and fusing and sticking as solder in order to keep the solder leading end portion in an appropriate state. A drop preventive part 224 is a part for preventing drop of unnecessary solder provided at the lower side in the direction of gravity to the solder fusing part 223.

In the optical processing apparatus thus configured, the operation is explained.

First of all, light emitted from the light energy output means 201 passes the half mirror 203 along the first optical path 202, and enters the optical means 204, in which this light is focused into a necessary size, and is emitted to the work 206 by way of the protective glass 205. The work 206 is machined by this focused light. The light reflected by the work 206 passes through the protective glass 205 and optical means 204, and is reflected by the half mirror 203 to get into the second optical path 209, and is reflected again by the mirror 207, and enters the photo receiving means 208 by way of the image distortion compensating means 221.

In processing, the driving means 210 moves the processing head and the work 206 relatively, and positions the light beam to the processing area.

The wire solder feed means 211 feeds the solder to the heated irradiation position and performs soldering when the light beam is emitted to the specified position of the work by the processing head. At this time, the first moving means 212 adjusts the irradiation diameter depending on the work, and the second moving means 213 and third moving means 214 adjust the wire solder feed position depending on the change of irradiation diameter. Further, the fourth moving means 215 adjusts the wire solder feed position 211 so that the wire solder feed means 211 may not interfere with the side wall or the like in the apparatus depending on the shape of the work 206.

The processing position detecting means 218 detects the position of the light beam emitted from the processing head on the basis of the information of the processing head position recognition means 217, and this signal is sent to the display means 216, and displayed as an image. The image of the work 206 is converted into an electric signal by the photo receiving means 208, and is displayed as the image of the processing area of the work 206 by the display means 216.

The processing position detecting means 218 detects the position of the light beam emitted from the processing head on the basis of the information of the processing head position recognition means 217. This signal is sent to the display means 216, and is displayed as an image. The image of the work 206 is converted into an electric signal by the photo receiving means 208, and is displayed as the image of the processing area of the work 206 by the display means 216. Herein, the processing position detection correcting means 219 detects the difference between the position of processing area of the work 206 by the photo receiving means 208 and the position of light beam emitted from the processing head, and sends the information to the processing position detecting means 218. The processing position detecting means 218 positions the processing head so as to eliminate the position error by the driving means 210 on the basis of this error position information, and processing is started by manipulating the light energy output means 201 of the processing head.

The leading end shape detecting means 222 judges the leading end shape of wire solder. If judged to be abnormal, the driving means 210 moves the wire solder leading end portion to the solder fusing part, and light beam is emitted by the light energy output means 201, and the solder fusing part 223 is heated over the solder melting point. Consequently, the wire solder feed means 211 feeds the wire solder, and presses to the solder fusing part, and an unnecessary portion of leading end is fused and adhered to the solder fusing part 223. At this time, if the wire solder leading end falls down, it is received by the unnecessary solder drop preventive part 224, and hence it does not stick to the protective glass or the like. In this way, while keeping the wire solder leading end in normal state and other parts also in normal state, stable soldering process of high quality can be continued.

The light beam may be emitted anywhere as far as above the solder fusing part, and the waste solder can be fused by its heat conduction, and it is also possible to prevent the light beam from being emitted to the unnecessary solder drop preventive part 224. Further, by using a material capable of transmitting the light beam in the unnecessary solder drop preventive part 224, effects of heat can be prevented.

Further, if the processing side of the work 206 is at the lower side, it is not required to invert the work 206, and inverting device is not needed. Hence, it is free from risk of dislocation due to inversion of the work 206 or dropping of the work or parts mounted thereon.

In an abnormal state of the wire solder leading end, in particular, in a folded state, if pressing directly to the solder fusing part 223, only the folded part is fused, and the folded wire solder leading end may fall down. At this time, however, it is received by the unnecessary solder drop preventive part 224, and hence it does not stick to the protective glass or the like. In this way, while keeping the wire solder leading end in normal state and other parts also in normal state, stable soldering process of high quality can be continued.

The processing position detecting means 218 detects the position of the light beam emitted from the processing head on the basis of the information of the processing head position recognition means 217. This signal is sent to the display means 216, and is displayed as an image, and the image of the work 206 is converted into an electric signal by the photo receiving means 208, and is displayed as the image of the processing area of the work 206 by the display means 216. Therefore, if the processing area is small or the processing area is at the lower side of the work and is hard to be recognized visually, it can be easily observed, and if the position is deviated, it can be recognized easily.

Further, by the image distortion correcting means 221 disposed before the photo receiving means 208, the image distortion can be suppressed, and the precision is not lowered at the time of teaching, checking correction or compensating recognition. Thus, according to the invention, by emitting light beam, the solder fusing part can be heated over the solder melting point, and the unnecessary portion of the leading end can be fused and adhered to the solder fusing part. Therefore, without requiring any particular heating device, and without space limitation, the wire solder leading end can be kept in normal state while saving the cost, and stable soldering process of high quality can be continued.

In the conventional optical processing apparatus described above, the solder feed method for soldering is not designed to detect the position of the solder leading end at the processing area of the work, and the solder is supplied for a predetermined solder feed time and at feed speed, whether the leading end of the solder is short or long for the processing area. Hence, a proper amount of solder is not supplied for the processing area, and excessive soldering or insufficient soldering occurs, and it is hard to assure the quality.

The invention is intended to present a optical processing apparatus for solving such problems, and examples are explained below by referring to exemplary embodiments 9 to 17.

Exemplary Embodiment 9

A ninth exemplary embodiment of the invention is described below while referring to FIGS. 11, 19, 20A, 20B, 20C, and 20D.

Light energy output means 301 is a processing energy source for producing a light energy. A first optical path 302 shows an optical path of the light energy for guiding the light energy to the work. A half mirror 303 has a function of transmitting wavelength components of light energy, and reflecting visible ray components. Optical means 304 shapes the light energy, and focuses the light emitted from the light energy output means 201 into a necessary beam diameter. Its focusing characteristic is determined depending on the divergent characteristic of the light energy source. A detachable protective glass 305 prevents foreign matter generated in processing from sticking to the optical means 304. If the light energy output is lowered due to deposits of foreign matter, by replacing the protective glass 105, the optical output is recovered, and the maintenance is facilitated. A work 306 is the object of processing of this apparatus. A mirror 307 guides the light of the work to photo receiving means 308. The photo receiving means 308 is means for viewing the image of the work and the leading end portion of the wire solder. A second optical path 309 shows an optical path of the photo receiving means 308. A processing head is composed of these elements from the light energy output mean 301 to the second optical path 309. Driving means 310 changes relative positions of the work 306 and optical means 304. A wire solder feed device 311 feeds a wire solder. Leading end shape detecting means 312 detects the shape of leading end of wire solder.

In the optical processing apparatus thus configured, the operation is explained.

Figure 19:
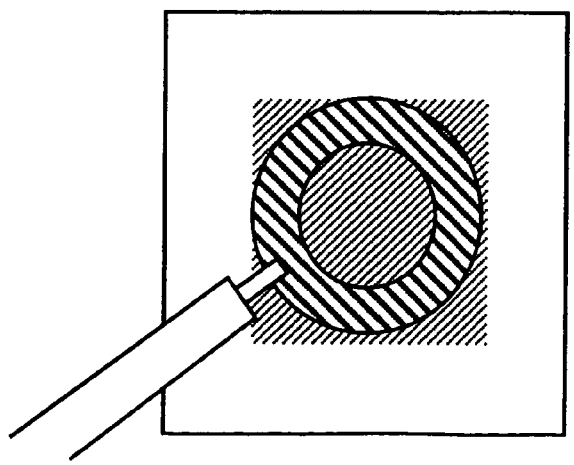
FIG. 19 is an explanatory diagram when the wire solder leading end shape is in normal state.
Figure 20A:
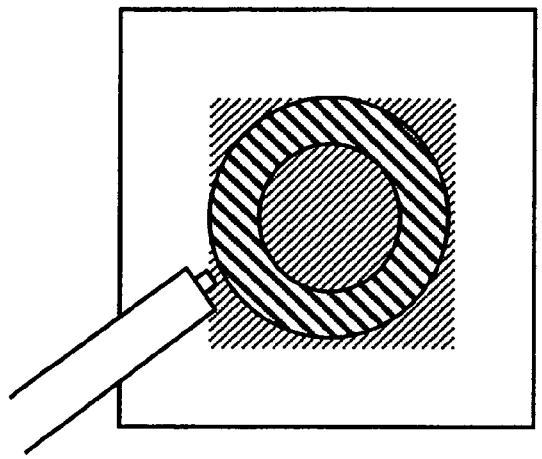
FIG. 20A is an explanatory diagram when the wire solder leading end shape is in abnormal state.
Figure 20B:
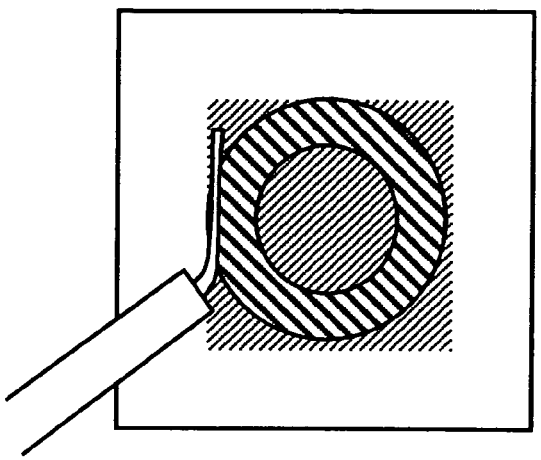
FIG. 20B is an explanatory diagram when the wire solder leading end shape is in abnormal state.
Figure 20C:
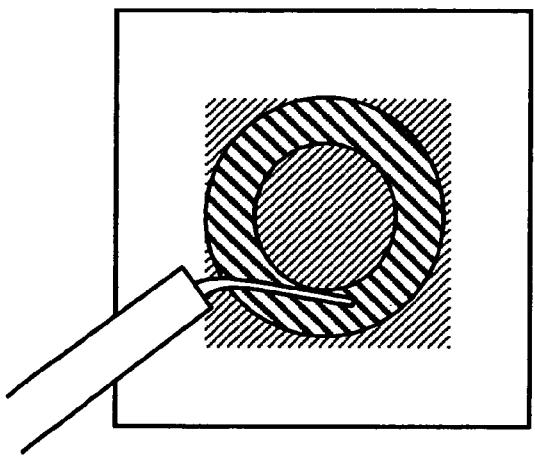
FIG. 20C is an explanatory diagram when the wire solder leading end shape is in abnormal state.
Figure 20D:
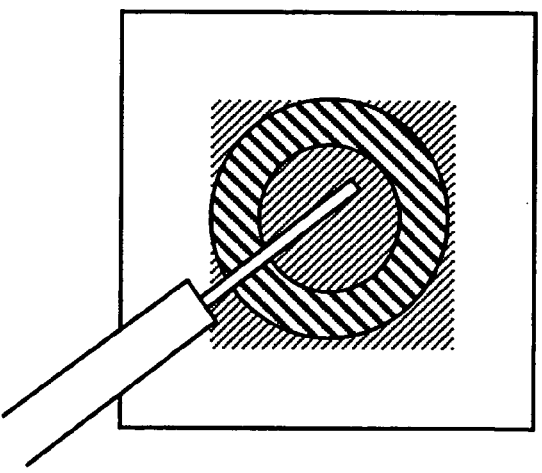
FIG. 20D is an explanatory diagram when the wire solder leading end shape is in abnormal state.

First of all, light emitted from the light energy output means 301 passes the half mirror 303 along the first optical path 302, and enters the light energy shaping means 304. Herein, this light is focused into a necessary size, and is emitted to the work 306 by way of the protective glass 305. The work 306 is machined by this focused light. The light reflected by the work 306 passes through the protective glass 305 and optical means 304, and is reflected by the half mirror 303 to get into the second optical path 309, and is reflected again by the mirror 307, and enters the photo receiving means 308. For local heating by focusing the light energy, driving means 310 is provided for relatively moving the processing head and the work, while suppressing heat effects on the work, and hence the processing region can be expanded. Also by the wire solder feed means 311, the light beam can be emitted to the specified position of the work by the processing head, and the solder is supplied into the heated irradiation position, and thereby soldering can be executed. Before or after soldering in the processing position, the leading end shape detecting means 312 judges the leading end of the solder 314 supplied from the wire solder nozzle 313, determines normal when it is as shown in FIG. 19. On the other hand, if the leading end of the solder 314 is as shown in any one of FIG. 20A to FIG. 20D, the leading end shape detecting means 312 judges the position is not appropriate, and detects solder failure.

By this constitution, a proper amount of solder can be supplied, and excessive solder and solder failure can be prevented, and the soldering condition suited to the work is realized, and soldering of high quality is executed.

For example, the light energy is laser or lamp, the photo receiving means is camera, the leading end shape detecting means is image recognition device, and image compensating means is lens.

Exemplary Embodiment 10

A tenth exemplary embodiment of the invention is described below while referring to FIG. 12.

Figure 12:
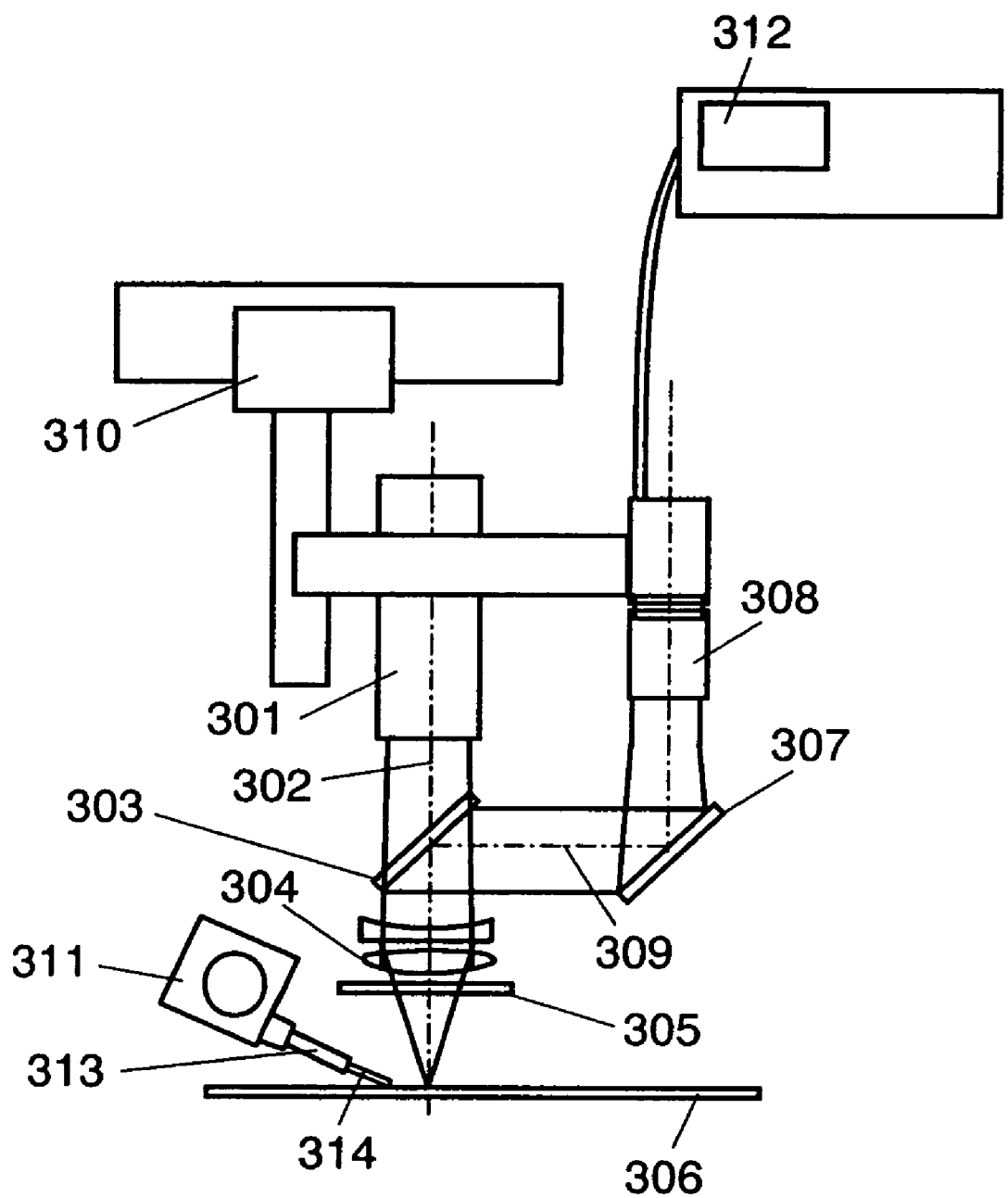
FIG. 12 is an explanatory diagram in exemplary embodiment 10 of the invention.

In FIG. 12, the structure from the light energy output means 301 to the solder 314 is same as in exemplary embodiment 9, and the explanation is omitted.

In this exemplary embodiment, the processing head is disposed at the lower in the acting direction of gravity on the work 306, and is designed to machine the lower side of the work 306.

By this constitution and configuration, if the processing side of the work 306 is at the lower side, it is not required to invert the work 306, and inverting device is not needed, and hence, it is free from risk of deviation of position due to inversion of the work 306 or dropping of the work or parts mounted thereon.

Exemplary Embodiment 11

An eleventh exemplary embodiment of the invention is described below while referring to FIG. 13.

Figure 13:
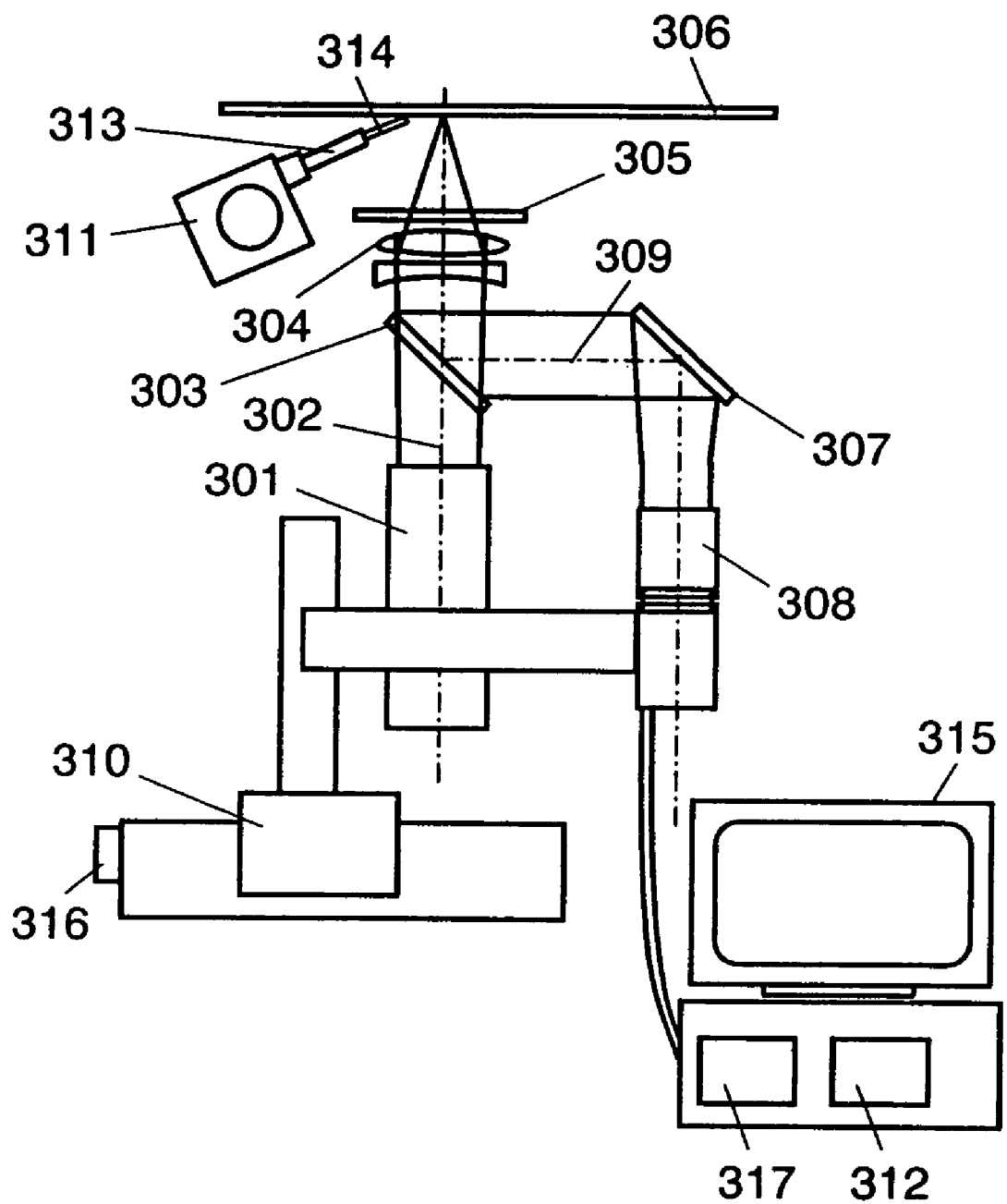
FIG. 13 is an explanatory diagram in exemplary embodiment 11 of the invention.

In FIG. 13, the structure from the light energy output means 301 to the solder 314 is same as in exemplary embodiment 9, and the explanation is omitted.

This exemplary embodiment further comprises display means 315 for displaying the image of the work 306 obtained by the photo receiving means 308, recognition means 316 detecting the position of the processing head, and processing position detecting means 317.

The processing position detecting means 317 detects the position of light beam emitted from the processing head on the basis of the information from the processing head position recognition means 316. This signal is sent to the display means 315, and is displayed as an image. The image of the work 306 is converted into an electric signal by the photo receiving means 308, and is displayed as an image of processing position of the work 306 by the display means 315. Accordingly, if the processing area is small, or the processing area is at the lower side of the work and is hard to recognize visually, it can be observed easily by this displayed image, or if the position is deviated, it can be easily detected, and position teaching or correction confirmation may be easily done.

For example, the processing position detecting means is computer, and the display means is CRT or LCD display device.

Exemplary Embodiment 12

A twelfth exemplary embodiment of the invention is described below while referring to FIG. 14.

Figure 14:
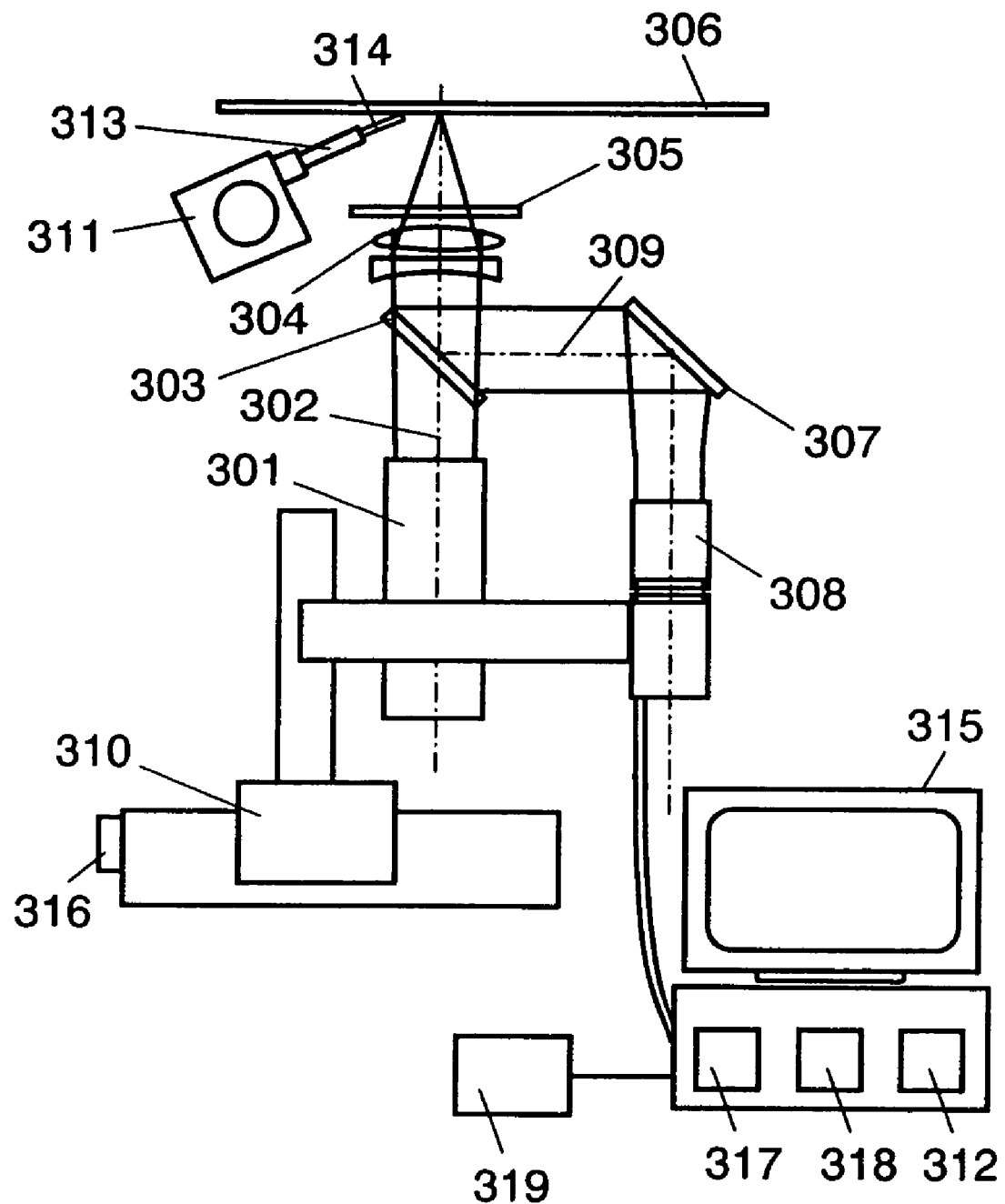
FIG. 14 is an explanatory diagram in exemplary embodiments 12 and 13 of the invention.

In FIG. 14, the structure from the light energy output means 301 to the processing position detecting means 317 is same as in exemplary embodiment 11, and the explanation is omitted.

This exemplary embodiment further comprises position detection correcting means 318.

In the optical processing apparatus thus configured, the operation is explained below. The processing position detecting means 317 detects the position of light beam emitted from the processing head on the basis of the information from the processing head position recognition means 316. This signal is sent to the display means 315, and is displayed as an image. The image of the work 306 is converted into an electric signal by the photo receiving means 308, and is displayed as an image of processing position of the work 306 by the display means 315. Herein, the processing position detection correcting means 318 detects the difference between the position of processing area of the work 306 by the photo receiving means 308 and the position of light beam emitted from the processing head, and sends the information to the processing position detecting means 317. The processing position detecting means 317 positions the processing head by compensating so as to eliminate the position error by the driving means 310 on the basis of this error position information, and processing is started by manipulating the light energy output means 301 of the processing head. By such position detection and correction motion, if the positioning precision of the work is low, the processing position precision can be assured.

For example, the processing head position recognition means is encoder of driving means, and the position detection correcting means is image recognition device.

Exemplary Embodiment 13

A thirteenth exemplary embodiment of the invention is described below while referring to FIG. 14.

In FIG. 14, the structure from the light energy output means 301 to the position detection correcting means 318 is same as in exemplary embodiment 12, and the explanation is omitted.

This exemplary embodiment further comprises image memory means 319.

In the optical processing apparatus thus configured, the operation is explained below. The processing position detecting means 317 detects the position of light beam emitted from the processing head on the basis of the information from the processing head position recognition means 316. This signal is sent to the display means 315, and is displayed as an image. The image of the work 306 is converted into an electric signal by the photo receiving means 308, and is displayed as an image of processing position of the work 306 by the display means 315. The processing head is installed in an acting direction of gravity on the work 306, and relative positions of the processing head and the work 306 can be changed by the driving means 310. Image data of the work 306 is stored in the image memory means 317. The image memory means 317 displays the image in the display means 313. The present light beam emitting position is also displayed in the display means 313 by the processing position detecting means 315. By this image memory means, the processing position can be taught off-line while observing the image of the work.

Specific examples of image data include CAD data, scanner image, and camera image.

Exemplary Embodiment 14

A fourteenth exemplary embodiment of the invention is described below while referring to FIG. 15.

Figure 15:
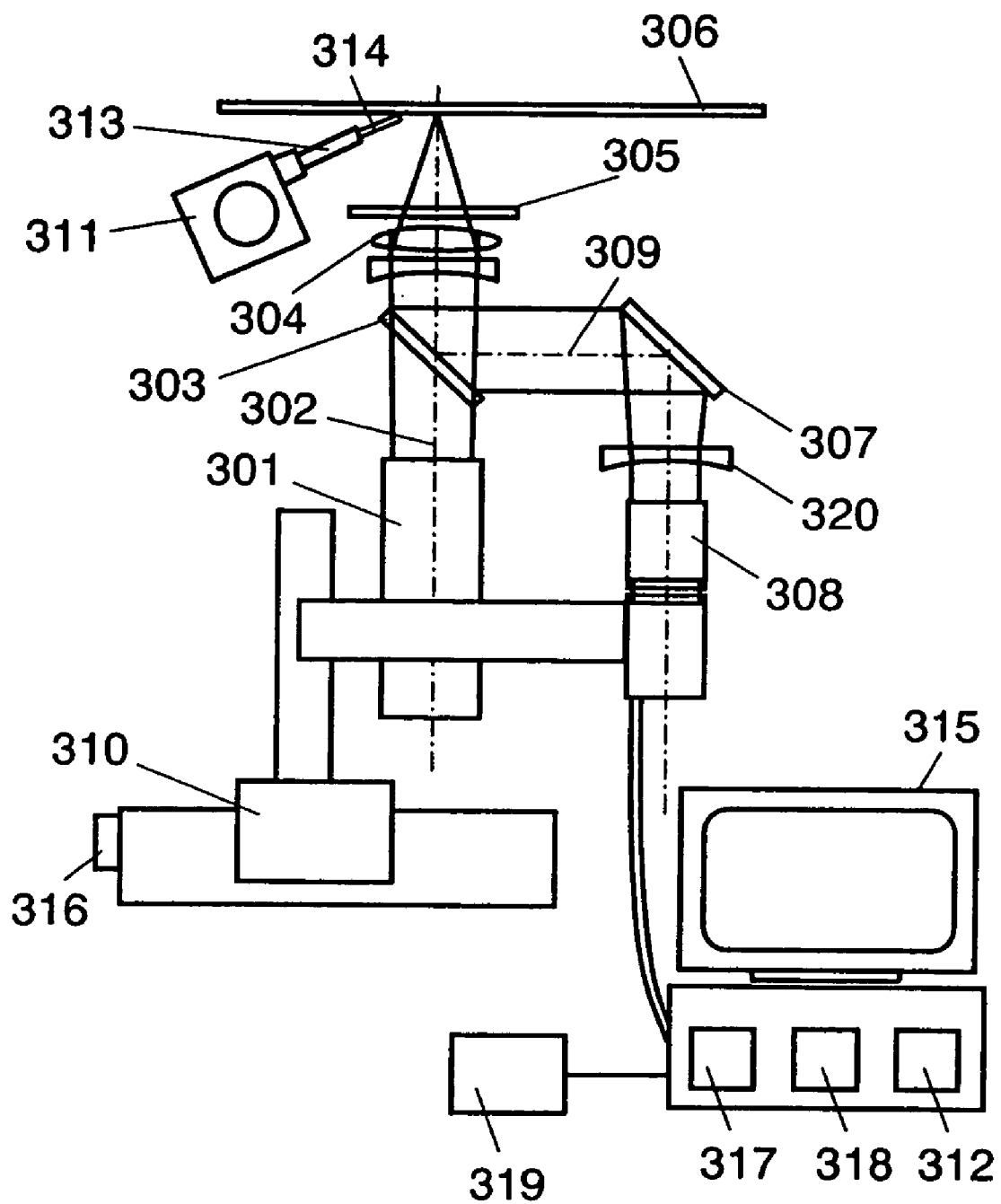
FIG. 15 is an explanatory diagram in exemplary embodiment 14 of the invention.

In FIG. 15, the structure from the light energy output means 301 to the image memory means 319 is same as in exemplary embodiment 13, and the explanation is omitted.

This exemplary embodiment further comprises image distortion correcting means 320 for compensating the image distorted by the optical means 304 provided between the mirror 307 and photo receiving means 308.

In the optical processing apparatus thus configured, the operation is explained below. The light coming out from the work 306 passes through the protective glass 305 and optical means 304, and is reflected by the half mirror 303 to get into the second optical path 309, and is reflected again by the mirror 307, and gets into the photo receiving means 308 by way of the image distortion correcting means 320. By the image distortion correcting means 320 disposed before the photo receiving means 308, distortion of image can be suppressed, and the precision is not lowered at the time of teaching, display confirmation or recognition compensation.

Exemplary Embodiment 15

A fifteenth exemplary embodiment of the invention is described below while referring to FIG. 16.

Figure 16:
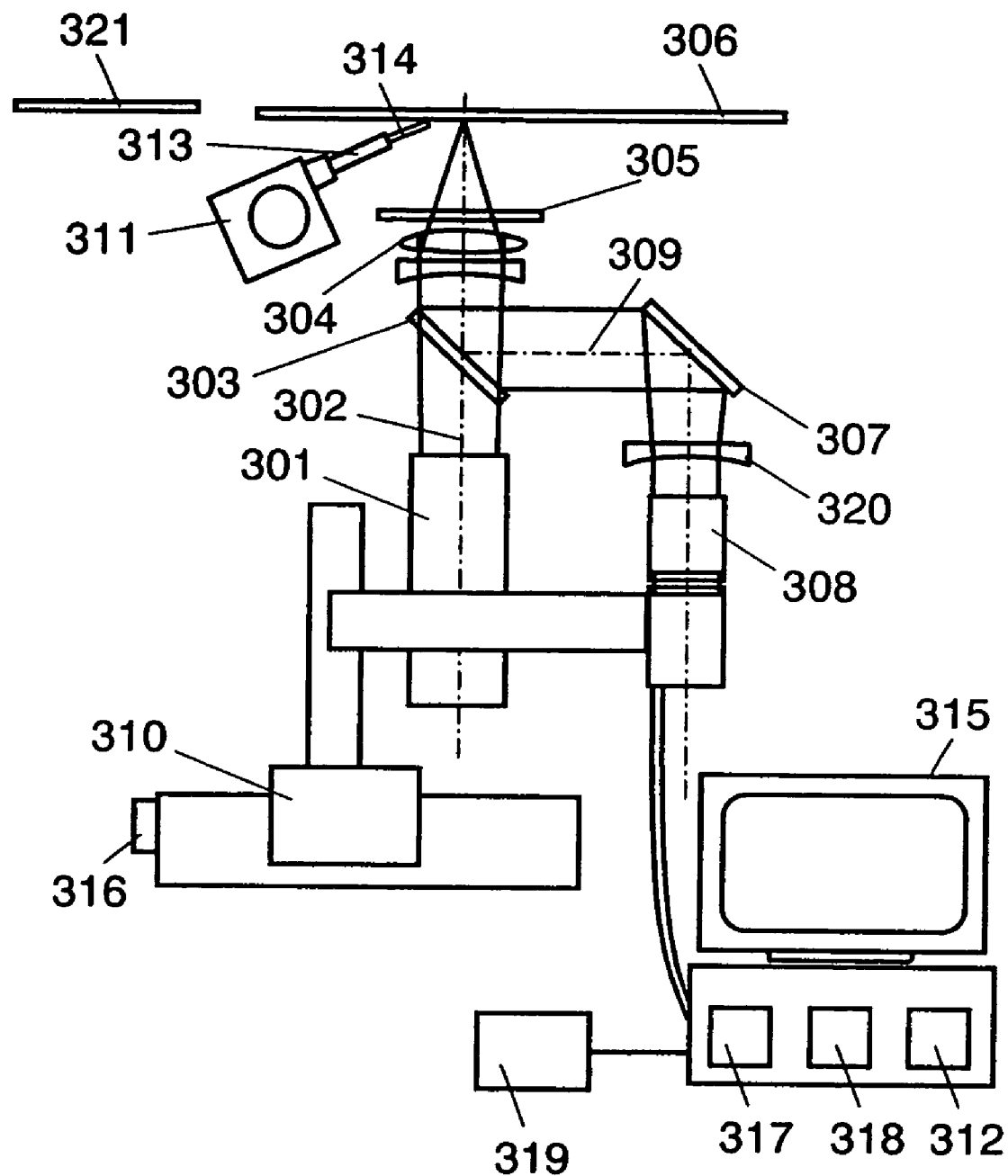
FIG. 16 is an explanatory diagram in exemplary embodiment 15 of the invention.

In FIG. 16, the structure from the light energy output means 301 to the image distortion correcting means 320 is same as in exemplary embodiment 14, and the explanation is omitted.

This exemplary embodiment further comprises a deposits judging part 321 for judging deposits of plural different colors.

In the optical processing apparatus thus configured, the operation is explained below. The driving means 310 can change relative positions of the work 306, deposits judging part 321 and the processing head, and after moving the processing head to the deposits judging part 321, sticking status of deposits is detected by the photo receiving means 308. Depending on the sticking status, by error stop before processing, the operator is warned of necessity of maintenance. Thus, the protective glass 305 is always in normal state during processing, and stable soldering of high quality can be continued. For judging deposits, judging patterns of plural different colors are prepared, so that various types of sticking status can be judged.

Exemplary Embodiment 16

A sixteenth exemplary embodiment of the invention is described below while referring to FIG. 17.

Figure 17:
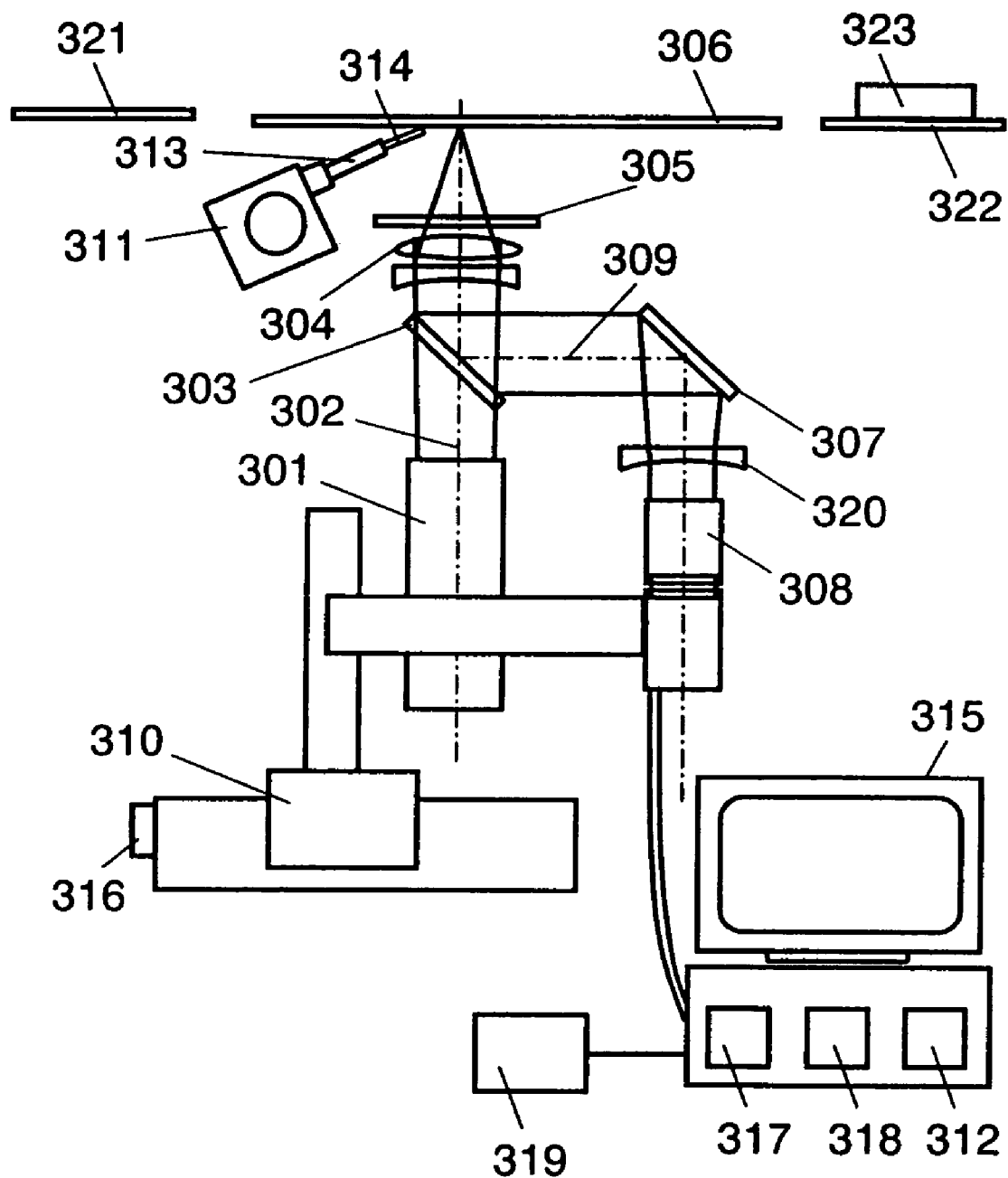
FIG. 17 is an explanatory diagram in exemplary embodiment 16 of the invention.

In FIG. 17, the structure from the light energy output means 301 to the deposits judging part 321 is same as in exemplary embodiment 15, and the explanation is omitted.

This exemplary embodiment further comprises a solder fusing part 322 for fusing and sticking unnecessary portion as waste solder in order to keep the solder leading end in appropriate state, and solder fusing part heating means 323 for heating the solder fusing part 322 over the solder melting point.

In the optical processing apparatus thus configured, the operation is explained below. The leading end shape detecting means 312 judges the state of the leading end shape of wire solder. If judged to be abnormal, the driving means 310 moves the wire solder leading end to the solder fusing part, and moves closer to the solder fusing part 322 heated over the solder melting point by the solder fusing part heating means 323. The wire solder feed means 311 feeds the wire solder, and presses to the solder fusing part, and the unnecessary portion of the leading end is fused and stuck to the solder fusing part 322. At this time, the solder fusing part may be heated beforehand, or may be heated quickly only when required to heat over the melting point.

Thus, the leading end state of the wire solder may be always kept in normal state, and stable soldering of high quality can be continued.

Exemplary Embodiment 17

A seventeenth exemplary embodiment of the invention is described below while referring to FIG. 18.

Figure 18:
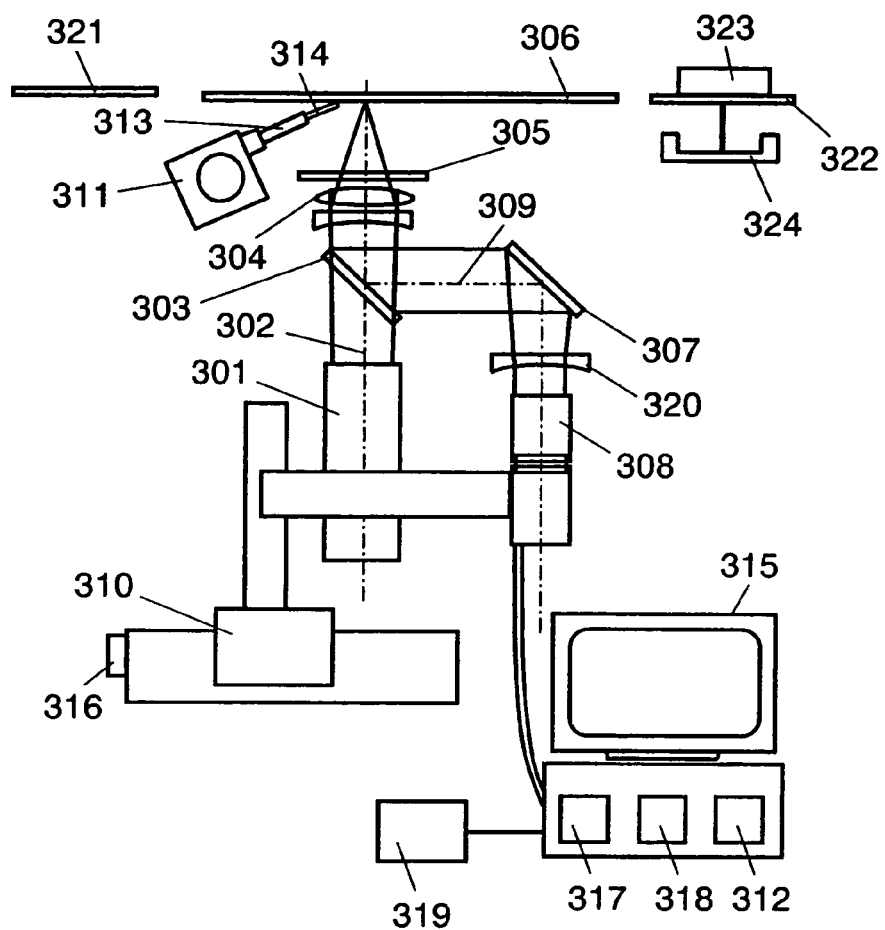
FIG. 18 is an explanatory diagram in exemplary embodiment 17 of the invention.

In FIG. 18, the structure from the light energy output means 301 to the solder fusing part heating means 323 is same as in exemplary embodiment 16, and the explanation is omitted.

This exemplary embodiment further comprises an undesired solder drop preventive part 324.

In the optical processing apparatus thus configured, the operation is explained below. When the leading end of the wire solder is in abnormal state, and in particular when folded, if it is directly fitted to the solder fusing part 322, only the folded portion is fused, and the folded leading end of the wire solder may drop. It is received by the undesired solder drop preventive part 324, and hence it is not stuck tot he protective glass or the like. Thus, while keeping the leading end of the wire solder in normal state and also keeping other parts in normal state, stable soldering of high quality can be continued.

As explained in the exemplary embodiments, the invention can detect the position of leading end portion of wire solder, so that a proper amount of solder can be supplied, and excessive soldering or solder failure can be prevented, and the soldering condition suited to the work can be realized, and soldering of high quality can be performed.

What is claimed is:

1. An optical processing apparatus comprising:
    a light source configured to produce light energy;
    a first optical path for guiding the light energy into a work;
    an optical device disposed in the first optical path for shaping the light energy;
    a second optical path sharing part of the first optical path for guiding the light energy from the work to a photo receiving device;
    a driving device configured to change the relative positions of at least the optical device and the work; and
    a judging part of plural different colors arranged at a position different from the work, wherein:
    the photo receiving device detects a color of the work,
    the photo receiving device detects the color difference between the color of the work and each of the plural different colors of the judging part,
    the driving device moves the optical device to the judging part of a color out of the plural different colors which is different from the detected color of the work, and
    the optical device shapes the light energy which is guided into the judging part.

2. The optical processing apparatus of claim 1, wherein a processing head holding at least the optical device, the second optical path and photo receiving device is disposed in an acting direction of gravity on the work.

3. The optical processing apparatus of claim 1, further comprising:
    display means for displaying at least the image of the processing area of the work; and
    processing position detecting means for leading out the position of the work where the light energy is located when the light energy shaped at least by the optical device is emitted to the work,
    wherein the display means displays the processing position led out by the processing position detecting means corresponding to the processing area of the work.

4. The optical processing apparatus of claim 3, wherein the processing position detecting means comprises:

means for recognizing the position of a processing head for holding at least the optical device, the second optical path and the photo receiving device; and position detection correcting means for compensating the difference between the position of the work where the light energy is located when the light energy shaped by the optical device is emitted to the work and the position detected by the recognizing means.

5. The optical processing apparatus of claim 3, further comprising memory means for storing preliminarily the image showing the processing area of the work.

6. The optical processing apparatus of claim 1, further comprising wire solder feeding means for feeding a wire solder tote vicinity of the processing area of the work.

7. The optical processing apparatus of claim 1, further comprising image distortion correcting means positioned at the second optical path and different from the first optical path, and positioned before the photo receiving device.

* * * * *